(12) United States Patent
Moritani et al.

(10) Patent No.: US 7,849,734 B2
(45) Date of Patent: Dec. 14, 2010

(54) TEST EQUIPMENT OF ENGINE MOTORING

(75) Inventors: Hitoshi Moritani, Tokyo (JP); Masahide Maeda, Tokyo (JP); Yoshio Kikukawa, Tokyo (JP); Ryosei Sekiguchi, Tokyo (JP); Tomoya Umeda, Tokyo (JP)

(73) Assignee: Hirata Corporation, Tokyo (JP)

( * ) Notice: Subject to any disclaimer, the term of this patent is extended or adjusted under 35 U.S.C. 154(b) by 550 days.

(21) Appl. No.: 10/573,572

(22) PCT Filed: Dec. 12, 2003

(86) PCT No.: PCT/JP03/15935

§ 371 (c)(1),
(2), (4) Date: Jul. 30, 2008

(87) PCT Pub. No.: WO2005/057159

PCT Pub. Date: Jun. 23, 2005

(65) Prior Publication Data

US 2009/0025466 A1 Jan. 29, 2009

(51) Int. Cl.
*G01M 15/02* (2006.01)

(52) U.S. Cl. .................. 73/116.05; 73/116.02

(58) Field of Classification Search ............. 73/116.01, 73/116.02, 116.03, 116.04, 116.05, 118.01, 73/118.02

See application file for complete search history.

(56) References Cited

U.S. PATENT DOCUMENTS

| | | | | |
|---|---|---|---|---|
| 3,697,865 A | * | 10/1972 | Smith et al. | 324/392 |
| 3,763,420 A | * | 10/1973 | Maisonville | 324/392 |
| 4,730,484 A | * | 3/1988 | Olschefski | 73/114.81 |
| 5,417,109 A | | 5/1995 | Scourtes | |
| 6,910,369 B2 | * | 6/2005 | Okuda et al. | 73/114.28 |
| 6,986,292 B2 | * | 1/2006 | Kemnade | 73/862.191 |
| 6,997,034 B2 | * | 2/2006 | Okuda et al. | 73/1.82 |
| 7,096,746 B2 | * | 8/2006 | Kemnade | 73/862.191 |
| 2003/0167628 A1 | * | 9/2003 | Tachibana et al. | 29/791 |
| 2004/0154376 A1 | * | 8/2004 | Okuda et al. | 73/1.82 |
| 2004/0255653 A1 | * | 12/2004 | Okuda et al. | 73/115 |
| 2005/0016295 A1 | * | 1/2005 | Kemnade | 73/862.28 |
| 2005/0199048 A1 | * | 9/2005 | Kemnade | 73/112 |

FOREIGN PATENT DOCUMENTS

DE 44 34 695 4/1995

(Continued)

*Primary Examiner*—Eric S McCall
(74) *Attorney, Agent, or Firm*—Wenderoth, Lind & Ponack, LLP.

(57) ABSTRACT

Test equipment of engine motoring for automatically conducting an engine test includes a conveying mechanism that carries in and carries out an engine to and from a test position, a fixing mechanism that fixes the engine carried in to the test position, a coupling mechanism that directly couples an electrical motor to the engine and can detect drive torque, an encoder that generates a pulse signal as an operating standard in synchronism with rotation of the electrical motor, a plurality of detection units driven to reciprocate so as to be connected to and disconnected from or approach and separate from the engine positioned at the test position and detect a plurality of operating state quantities, a control unit for various driving controls, and a judging unit for judging whether the engine is normal by comparing information obtained by the plurality of detection units with standard information obtained in advance.

11 Claims, 15 Drawing Sheets

FOREIGN PATENT DOCUMENTS

| | | |
|---|---|---|
| FR | 2 710 748 | 4/1995 |
| GB | 2 282 411 | 4/1995 |
| JP | 56-016841 | 2/1981 |
| JP | 59-094033 | 5/1984 |
| JP | 6-186135 | 7/1994 |
| JP | 7-159286 | 6/1995 |
| JP | 7-41444 | 7/1995 |
| JP | 10-170407 | 6/1998 |
| JP | 2865574 | 12/1998 |
| JP | 2883117 | 2/1999 |
| JP | 2996080 | 10/1999 |
| JP | 11-304658 | 11/1999 |
| JP | 2002-005793 | 1/2002 |
| JP | 2002-296150 | 10/2002 |

* cited by examiner

TEST EQUIPMENT OF ENGINE MOTORING

BACKGROUND OF THE INVENTION

1. Technical Field

The present invention relates to test equipment of engine motoring which forcibly operates an internal combustion engine by an electrical motor, and in particular, to test equipment of engine motoring which automatically conducts a test to detect the presence or absence of a defect, etc., in an assembled engine in a final process of a line for automatically assembling an engine.

2. Background Art

As conventional equipment for testing an internal combustion engine by means of motoring, there is known equipment that detects an actuating state of an intake valve and an exhaust valve and the presence or absence of a piston ring by measuring intake and exhaust pressures while rotating an engine fixed at a predetermined position at a low number of rotations (for example, 10 rpm through 20 rpm) upon coupling an electrical motor to the engine, equipment that detects an attaching state of parts assembled in a lubricating oil path by measuring the oil pressure of lubricating oil, and equipment that detects whether cutting swarf, etc., is caught in sliding portions such as a portion between a crank shaft and a bearing by measuring torque fluctuations (for example, Japanese Patent Publications No. 2865574, No. 2996080, and No. 2883117).

However, in the conventional test equipment, it is possible that a part of the assembled engines is extracted and set at an exclusive test location and tested by motoring, but, in an automatic production line in which engines are automatically assembled, it is difficult to conduct the motoring test for all engines.

In addition, in the conventional test equipment, the motoring speed is a number of rotations (several tens of rpm) extremely slower than the number of rotations (several hundreds through several thousands of rpm) of the actual combustion operation, so that an error easily occurs in a pressure value obtained in, for example, measurement of an intake pressure or an exhaust pressure, and it is difficult to detect information that reflects a state of an actual operating combustion engine.

Furthermore, in the conventional test equipment, partial operating state quantities of an engine are measured, so that it is difficult to totally evaluate the state of the engine based on various operating state quantities of an engine such as torque fluctuations, lubricating oil pressure, lubricating oil temperature, intake pressure, exhaust pressure, ignition timing, vibration level, and noise level.

The present invention has been achieved in view of the circumstances of the conventional techniques, and an object thereof is to provide test equipment of engine motoring which can simultaneously measure various operating state quantities when testing an engine by motoring, and in particular, can automatically conduct a test with high accuracy for all engines in an automatic engine assembly line.

SUMMARY OF THE INVENTION

The test equipment of engine motoring of the present invention that achieves the above-mentioned object includes a conveying mechanism that carries in and carries out an engine to and from a test position, a fixing mechanism that fixes the engine carried into the test position, a coupling mechanism that directly couples an electrical motor to a crank shaft of the engine and detects a drive torque, an encoder that generates a pulse signal that becomes an operating standard in synchronism with rotation of the electrical motor, a plurality of detection units that are driven to reciprocate so as to be connected to and disconnected from or approach and separate from the engine positioned at the test position and detect a plurality of operating state quantities, respectively, a control means that controls operations of the electrical motor, the conveying mechanism, the fixing mechanism, the coupling mechanism, and the plurality of detection units, and a judging means that judges whether the engine is normal by comparing information obtained by the plurality of detection units with standard information obtained in advance.

According to this construction, for example, in an automatic engine assembly line, based on controlling of the control means, an assembled engine is carried into a test position by the conveying mechanism and fixed by the fixing mechanism, an electrical motor is directly coupled to the crank shaft by the coupling mechanism, the plurality of detection units are set on (driven to be connected to or approach) the engine, and the engine is rotated at the same number of rotations as that of the electrical motor (for example, 100 rpm through 3500 rpm). Then, by using a pulse signal generated from the encoder in synchronism with the electrical motor as a clock, the judging means compares information obtained from the plurality of detection units during this motoring with the standard information to judge whether the engine is normal.

Thus, a motoring test can be automatically conducted for the engine, and an inspection of defects can be made with high accuracy. Therefore, this equipment can also be applied to an automatic production line, etc., in which engines are automatically assembled, whereby the productivity of the engines can be improved.

In the equipment constructed as described above, for the engine to be conveyed by the conveying mechanism, ID data for identifying the engine may be set, and the control means may be set in a test mode of the engine based on the ID data.

According to this construction, ID data is set for each engine, so that a test mode suitable for the engine can be set and operation information of the engine obtained through the motoring test can be judged by comparing it with standard information determined in advance for the engine. Therefore, a highly-accurate motoring test can be conducted for each of the different types of engines.

In the equipment constructed as described above, a construction can be employed in which a base that holds the electrical motor and the coupling mechanism and supports the conveying mechanism is provided, and a gate-shaped frame that opens in the conveying direction of the conveying mechanism and covers both of the sides and the top of the engine at the test position is provided on the base, and the frame supports the plurality of test units.

According to this construction, the plurality of detection units are supported on a gate-shaped frame provided on the base, so that the entire mechanical rigidity and resistance to vibrations can be enhanced. Therefore, the engine vibration level or noise level can be detected with high accuracy while restraining noise as much as possible.

In the equipment constructed as described above, a construction can be employed in which the plurality of detection units detect at least two operating state quantities among the intake pressure, the exhaust pressure, the lubricating oil pressure, the lubricating oil temperature, the vibration level, the rotation phase of the crank shaft, and the electrical characteristics of an ignition system in an engine during motoring.

According to this construction, based on a standard signal (pulse signal) generated by the encoder, these operating state quantities are detected in addition to the drive torque obtained by the coupling mechanism, and are compared with the standard information, whereby it can be judged whether fitting of driving portions is proper, the presence or absence of missing parts of any driving parts, the presence or absence of mixing of swarf, whether assembling adjustments are proper, the presence or absence of nonconforming parts, the presence or absence of assembling defects, whether the ignition timing is proper, and the presence or absence of disconnection, and therefore the state of the engine can be totally evaluated.

In the equipment constructed as described above, a construction can be employed in which each of the plurality of detection units includes a detector for detecting operating state quantities of an engine positioned at the test position, and a drive mechanism that reciprocates the detector so as to be connected to and disconnected from or approach and separate from an inspecting portion of the engine.

According to this construction, the drive mechanism is driven based on a control signal of the control means, and each detector is driven so as to be connected to and disconnected from or approach and separate from an inspecting portion of the engine. Therefore, the plurality of detection units can respectively be driven with desired timings.

In the equipment constructed as described above, a construction can be employed in which the plurality of detection units include an intake pressure detection unit for detecting an intake pressure, and the intake pressure detection unit includes a connecting pipe to be connected to and disconnected from an intake pipe of the engine, and a pressing rod that opens a throttle valve disposed inside the intake pipe when the connecting pipe is connected to the intake pipe of the engine.

According to this construction, when the connecting pipe of the intake pressure detection unit is connected to the intake pipe of the engine positioned at the test position, the pressing rod presses and opens the throttle valve, so that the motoring test can be smoothly conducted even for an engine with the throttle valve assembled.

In the equipment constructed as described above, a construction can be employed in which the plurality of detection units include an exhaust pressure detection unit for detecting an exhaust pressure, and the exhaust pressure detection unit includes an exhaust pipe for guiding air exhausted from the engine, a throttle portion provided inside the exhaust pipe, and a detector that is disposed further upstream than the throttle portion and detects an exhaust pressure.

According to this construction, when a pressure of exhaust air exhausted from the engine is detected, the detector detects the exhaust pressure at the upstream side of the throttle portion provided in the exhaust pipe of the exhaust pressure detection unit, so that even a pressure at a comparatively low level can be detected with high accuracy.

In the equipment constructed as described above, a construction can be employed in which the plurality of detection units include an electrical characteristic detection unit for detecting electrical characteristics of the ignition system, and the electrical characteristic detection unit includes a connector that is connected to the ignition system of the engine and conducts a current, and a detector for detecting the voltage characteristic generated in the ignition system due to current conduction.

According to this construction, the presence or absence of disconnection in the ignition system (ignition coil, etc.) of the engine can be detected and it can be detected whether the ignition timing is proper.

In the equipment constructed as described above, a construction can be employed in which a detection unit that detects at least one state quantity among the oil filter temperature of the engine, the noise level around the engine, the atmosphere temperature, the atmosphere humidity, and the outside air pressure during motoring is further included.

According to this construction, by detecting this information and additionally considering this information in judgment, the state of the engine can be more accurately evaluated.

In the equipment constructed as described above, a construction can be employed in which the detection units include an oil filter temperature detection unit for detecting the oil filter temperature of the engine, and the oil filter temperature detection unit includes a non-contact type detector for detecting the temperature of the oil filter from the outside.

According to this construction, the oil filter temperature is detected in a non-contact manner, so that a layout in which carrying-in and carrying-out of the engine by the conveying mechanism is not obstructed (for example, the oil filter detection unit is fixed to the frame) can be easily obtained, and when it is difficult to directly detect the temperature of the lubricating oil, it is indirectly detected, whereby the structure and the control system can be simplified.

In the equipment constructed as described above, a construction can be employed in which the fixing mechanism includes a clamper that clamps a flange portion formed on a cylinder block of the engine.

According to this construction, by clamping the engine carried in to the test position by the clamper, the engine can be firmly and smoothly fixed, and the time for preparation for the motoring test can be shortened.

In the equipment constructed as described above, a construction can be employed in which the coupling mechanism includes a plurality of coupling fingers that are swingably driven so as to engage with a ring gear directly fixed to the crank shaft of the engine and that rotate together with the electrical motor.

According to this construction, by engagement of the plurality of coupling fingers with the ring gear (for example, provided integrally with a flywheel) of the engine carried into and fixed at the test position, the electrical motor and the crankshaft are directly coupled to each other, so that the engine can be securely rotated at the same number of rotations as that of the electrical motor, and the time for preparation for the motoring test can be shortened.

DETAILED DESCRIPTION OF THE INVENTION

Figure 1:
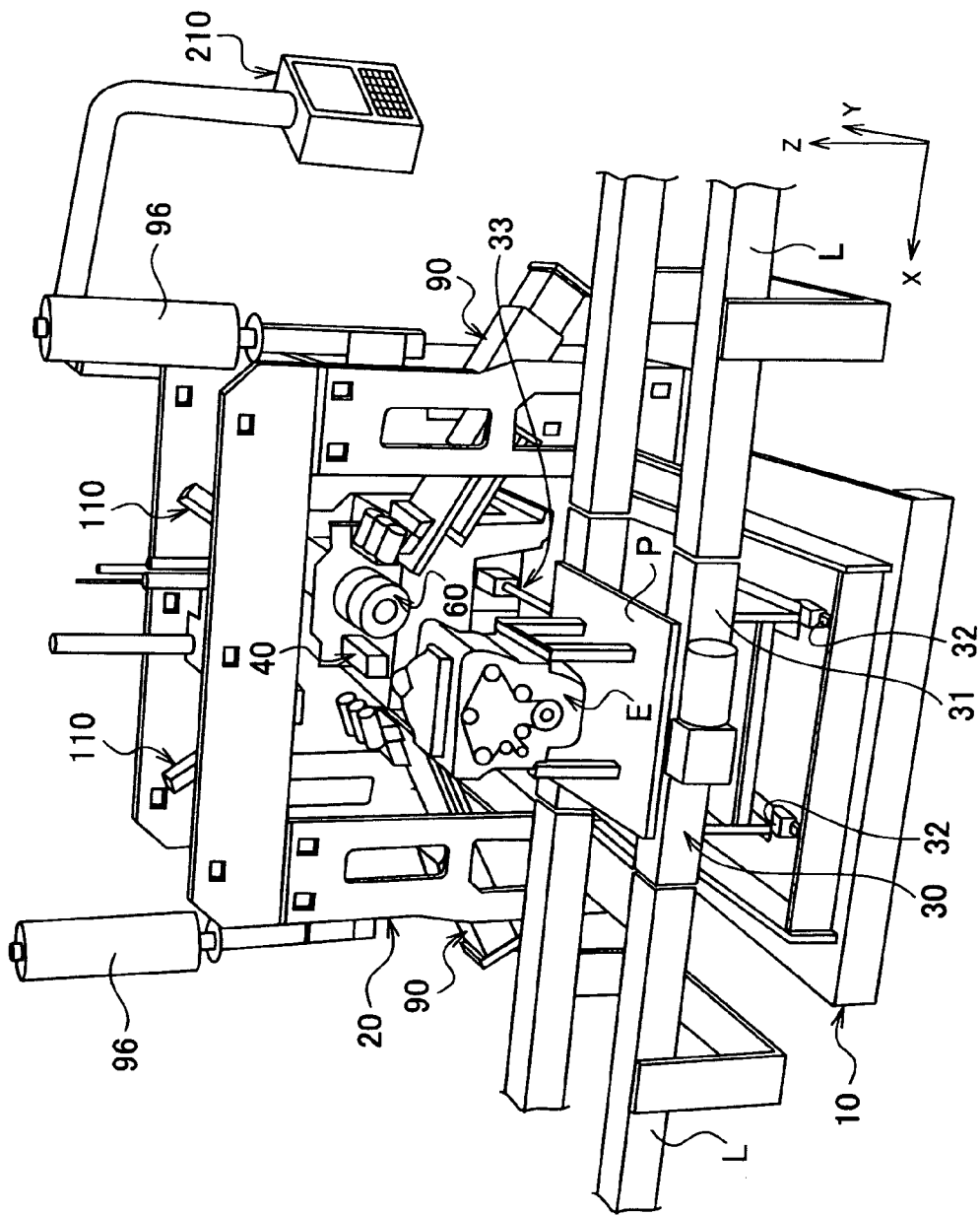
FIG. 1 is an external appearance perspective view showing a state in that test equipment of motoring is installed in a part of an automatic engine assembly line.
Figure 2:
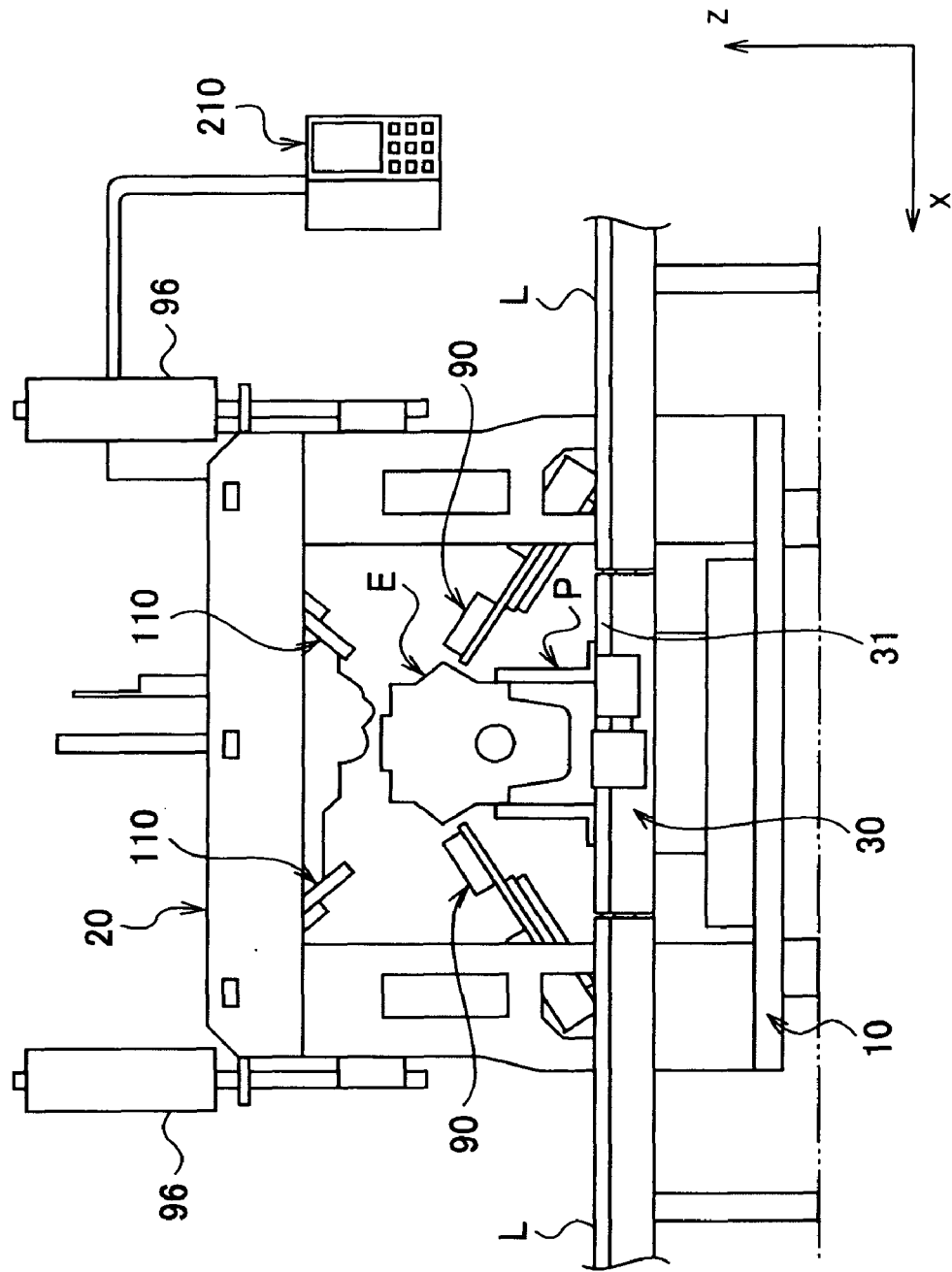
FIG. 2 is a front view showing a state in which the test equipment of motoring is installed in a part of the automatic engine assembly line.

Hereinafter, an embodiment of the present invention is explained with reference to the drawings.

The test equipment of engine motoring is installed in a final process of a line L for producing an engine E by automatic assembly (herein, a V-shaped 6-cylinder engine), and includes, as shown in FIG. 1 through FIG. 4, a base 10, a gate-shaped frame 20 fixed onto the base 10, a conveying mechanism 30 that is disposed on the base 10 and carries in and carries out the engine conveyed from the line L to and from a test position, a fixing mechanism 40 that fixes the engine E carried into the test position, an electrical motor 50 fixed on the base 10, a coupling mechanism 60 that directly couples the electrical motor 50 to a crank shaft of the engine E and detects a drive torque, an encoder 70 that generates a pulse signal as an operating standard, etc.

Figure 14:
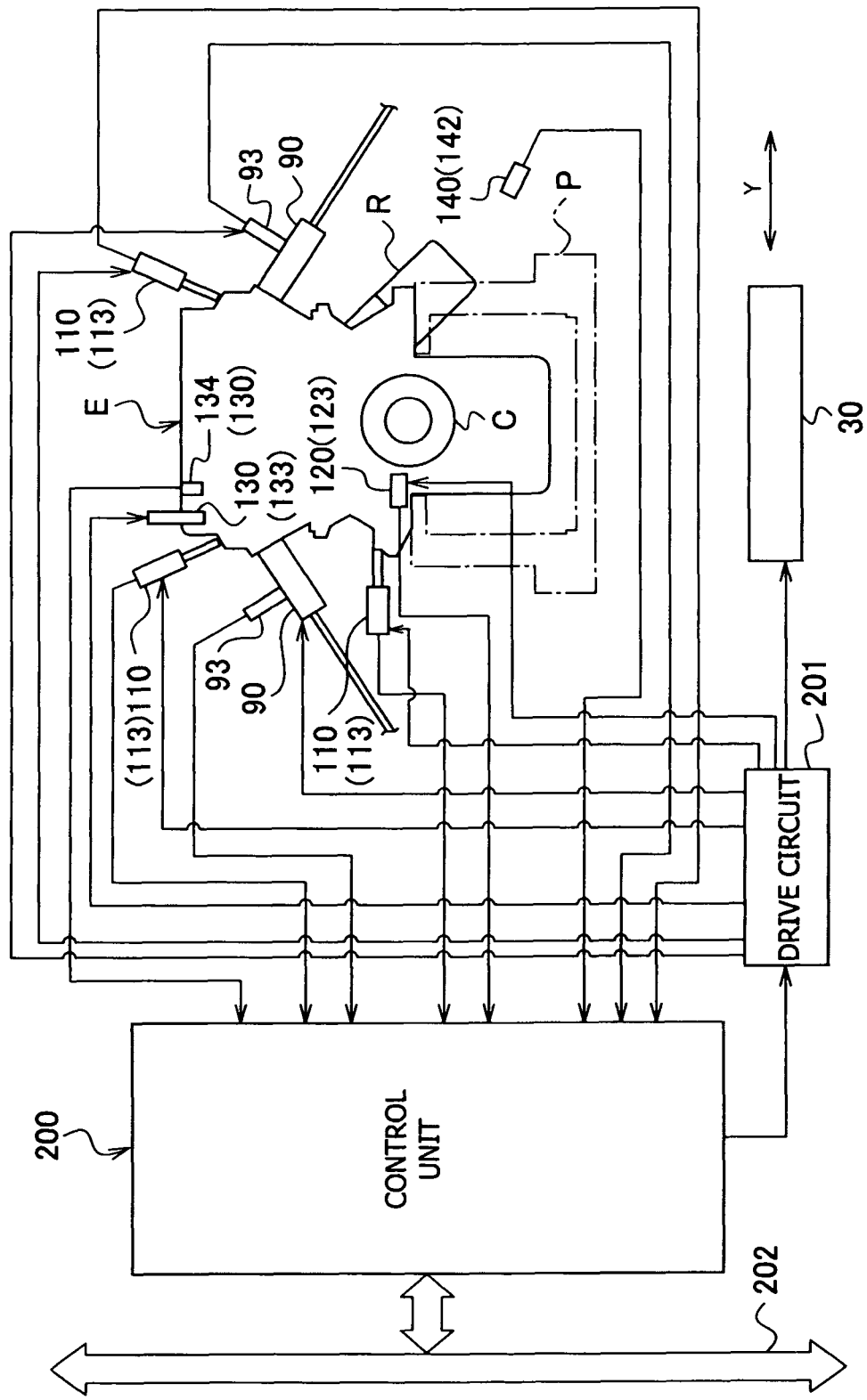
FIG. 14 is a block diagram showing a control system of the test equipment of engine motoring.
Figure 15:
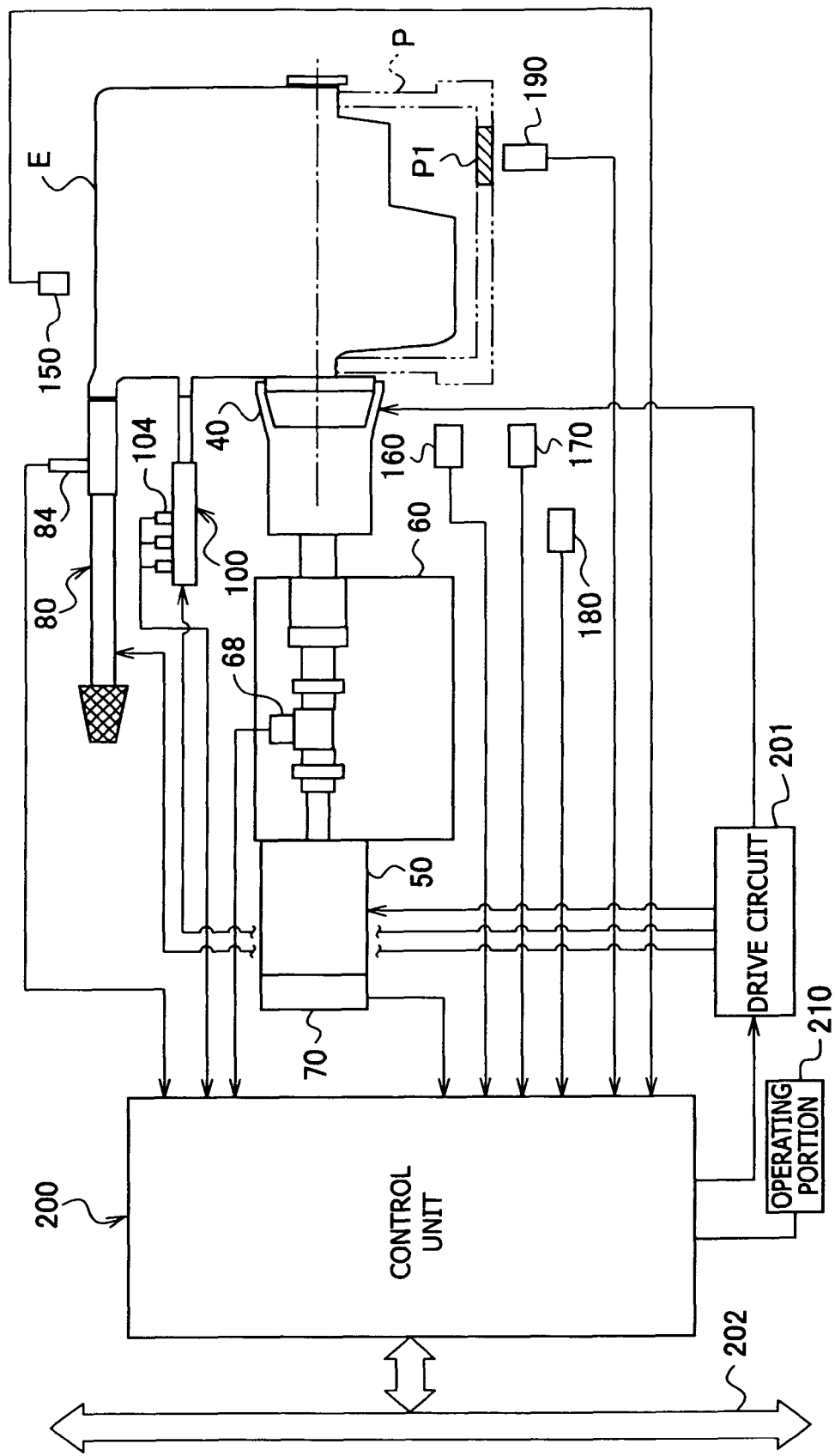
FIG. 15 is a block diagram showing a control system of the test equipment of engine motoring.

In addition, this test equipment includes, as shown in FIG. 14 and FIG. 15, an intake pressure detection unit 80, an exhaust pressure detection unit 90, an oil pressure detection unit 100, a vibration level detection unit 110, a rotation phase detection unit 120, and an electrical characteristic detection unit 130 which respectively detect an intake pressure, an exhaust pressure, a lubricating oil pressure, a vibration level, a crank shaft rotation phase, and electrical characteristics of an ignition system (ignition coil) as operating state quantities of the engine E, an oil filter temperature detection unit 140 that detects an oil filter temperature of the engine E, a noise level detection unit 150, an atmosphere temperature detection unit 160, an atmosphere humidity detection unit 170, and an outside air pressure detection unit 180 which respectively detect noise levels around and inside the engine E, an atmosphere temperature, an atmosphere humidity, and the outside air pressure, a reading unit 190 that reads ID data P1 for identifying the engine E, a control unit 200 as control means for controlling the entire equipment and as judging means, an operating portion 210, and so on.

The base 10 is formed into a roughly rectangular shape so as to hold the conveying mechanism 30, the electrical motor 50, and the coupling mechanism 60 and movably support the conveying mechanism 30.

The frame 20 is formed into a gate shape so as to cover both of the sides and the top of the engine E carried into the test position and fixed to the base 10. The frame 20 holds the plurality of detection units 80 through 180 in a reciprocating or fixed manner.

The base 10 and the frame 20 are formed into a low center-of-gravity structure by a weight twice the weight of a normal base for supporting the devices of the production line, whereby the entire mechanical rigidity and resistance to vibrations are enhanced. Therefore, even if the engine E is rotated at a high number of rotations, resonance is not generated, and the vibration level and noise level of the engine E itself can be detected with high accuracy.

As shown in FIG. 1 through FIG. 4, the conveying mechanism 30 is formed by a stopper (not shown) that stops a pallet P when the engine E supported by the pallet P is conveyed by the line L and reaches a predetermined position, a movable carrier 31 that is driven to reciprocate in the Y direction, guide rails 32 that guide the movable carrier 31, a drive mechanism 33 including a servo motor and a ball screw, etc.

Based on a control signal of the control unit 200, the conveying mechanism 30 carries the engine E into the test position and carries out the engine E that has been tested to a position on the line L.

Figure 4:
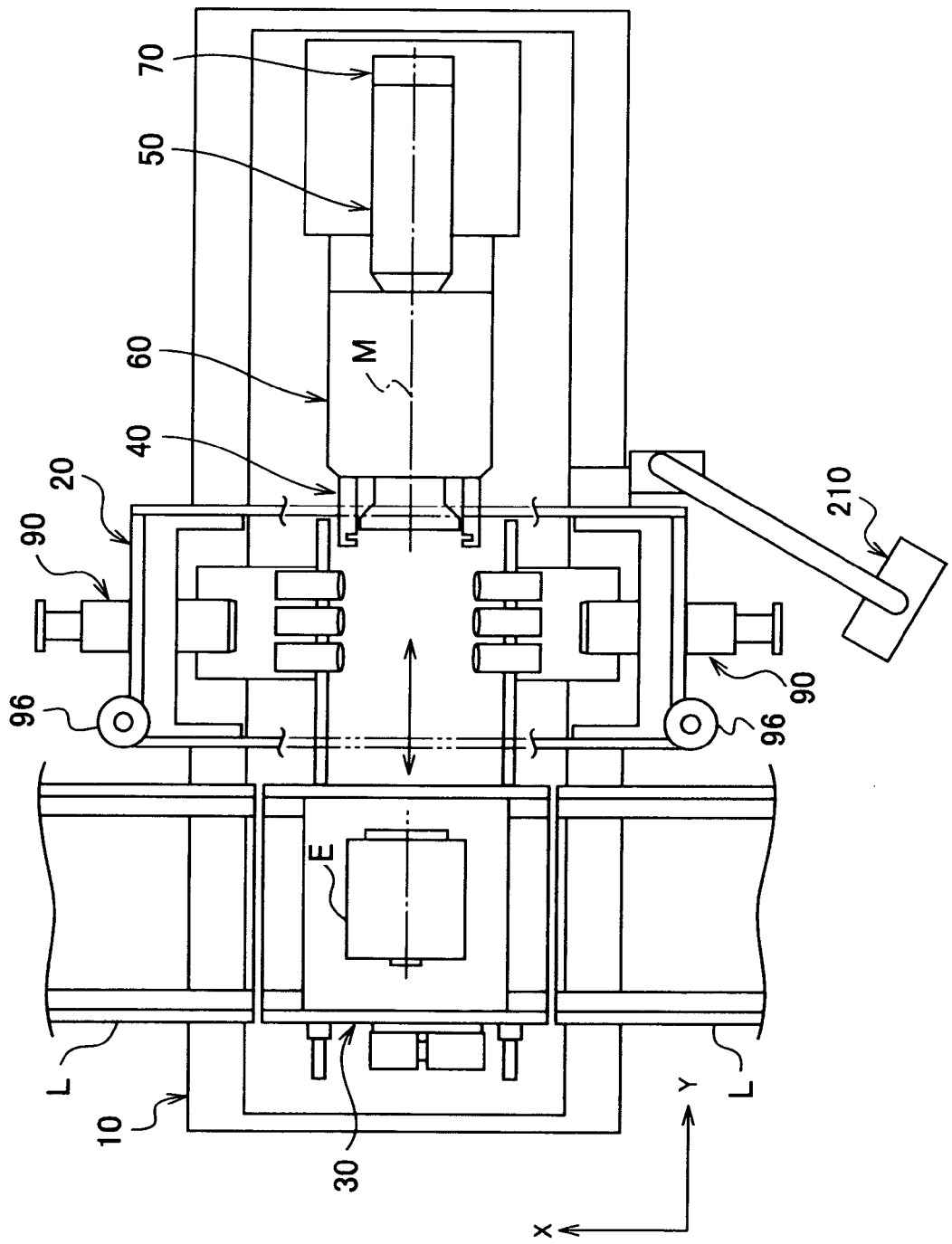
FIG. 4 is a plan view showing a state in which the test equipment of motoring is installed in a part of the automatic engine assembly line.
Figure 5:
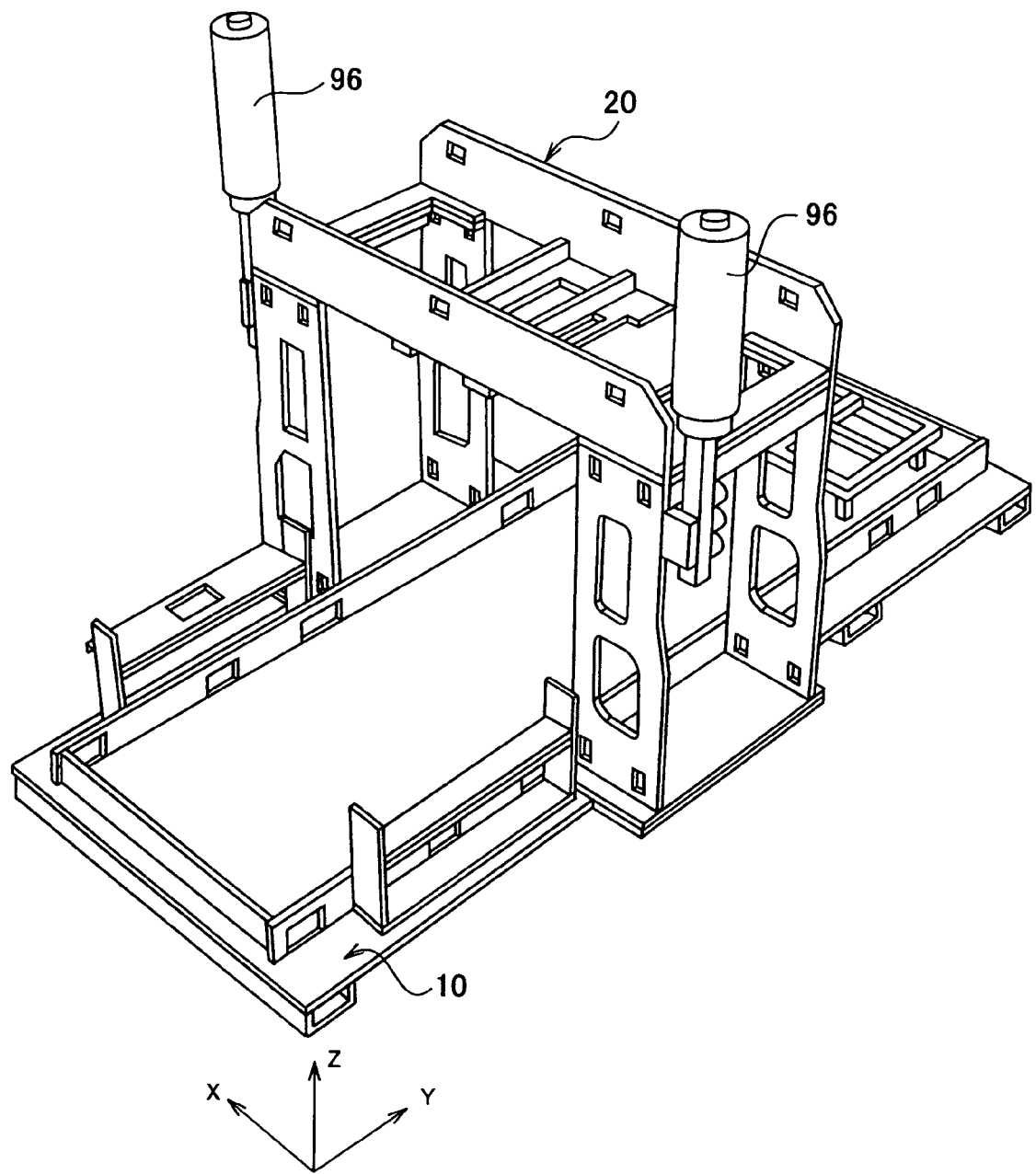
FIG. 5 is an external appearance perspective view showing a frame structure in the test equipment of engine motoring.
Figure 6:
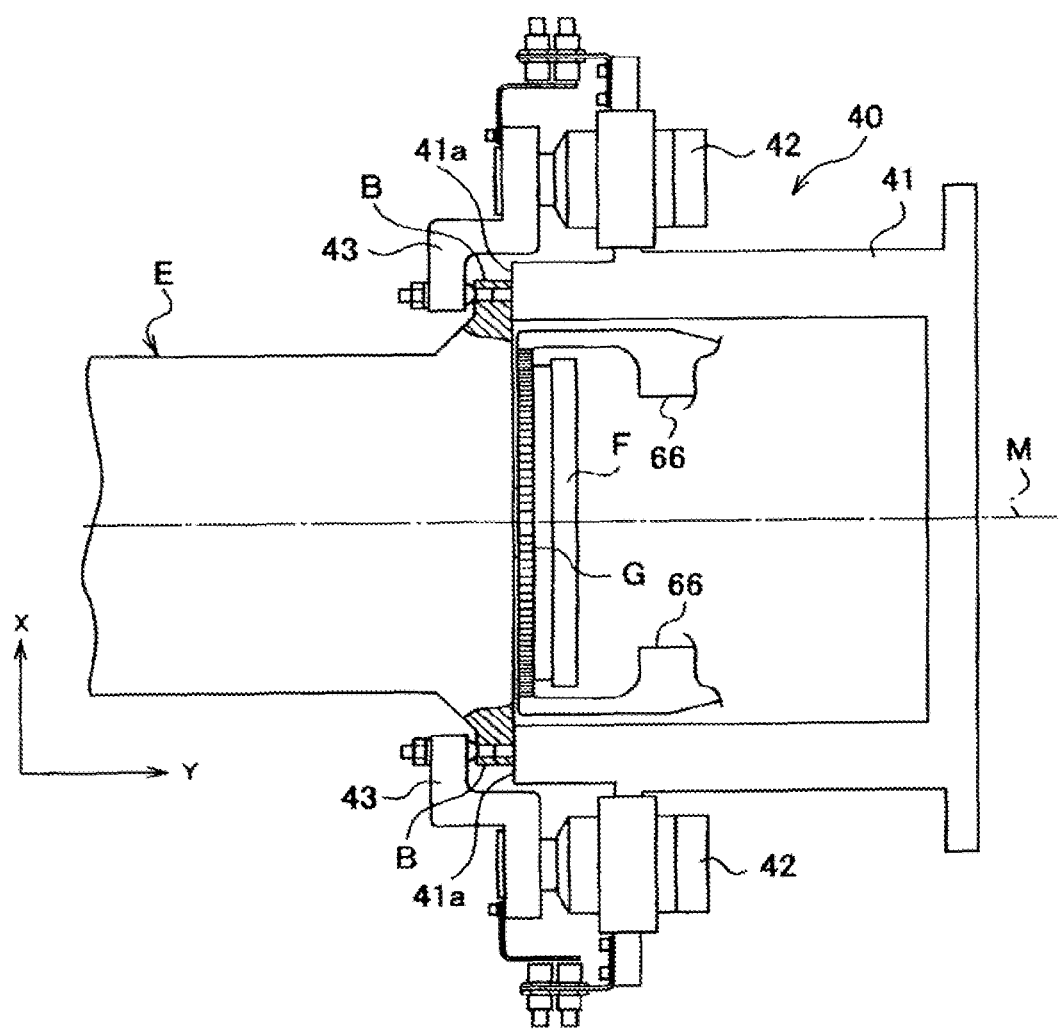
FIG. 6 is a plan view showing a fixing mechanism that fixes an engine to a test position.
Figure 7:
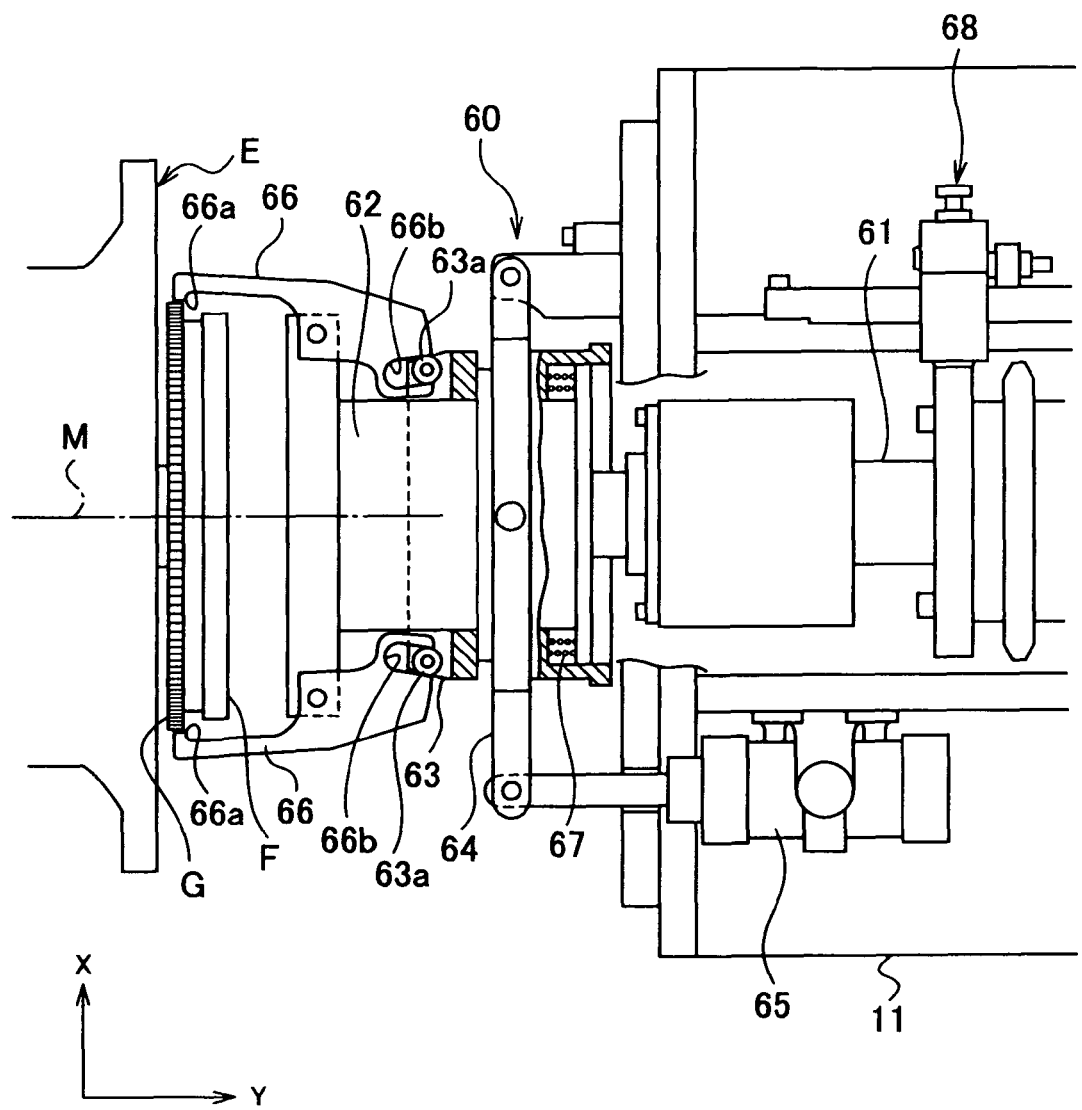
FIG. 7 is a plan view showing a coupling mechanism for transmitting a rotating force of an electrical motor to the crank shaft of the engine.
Figure 8:
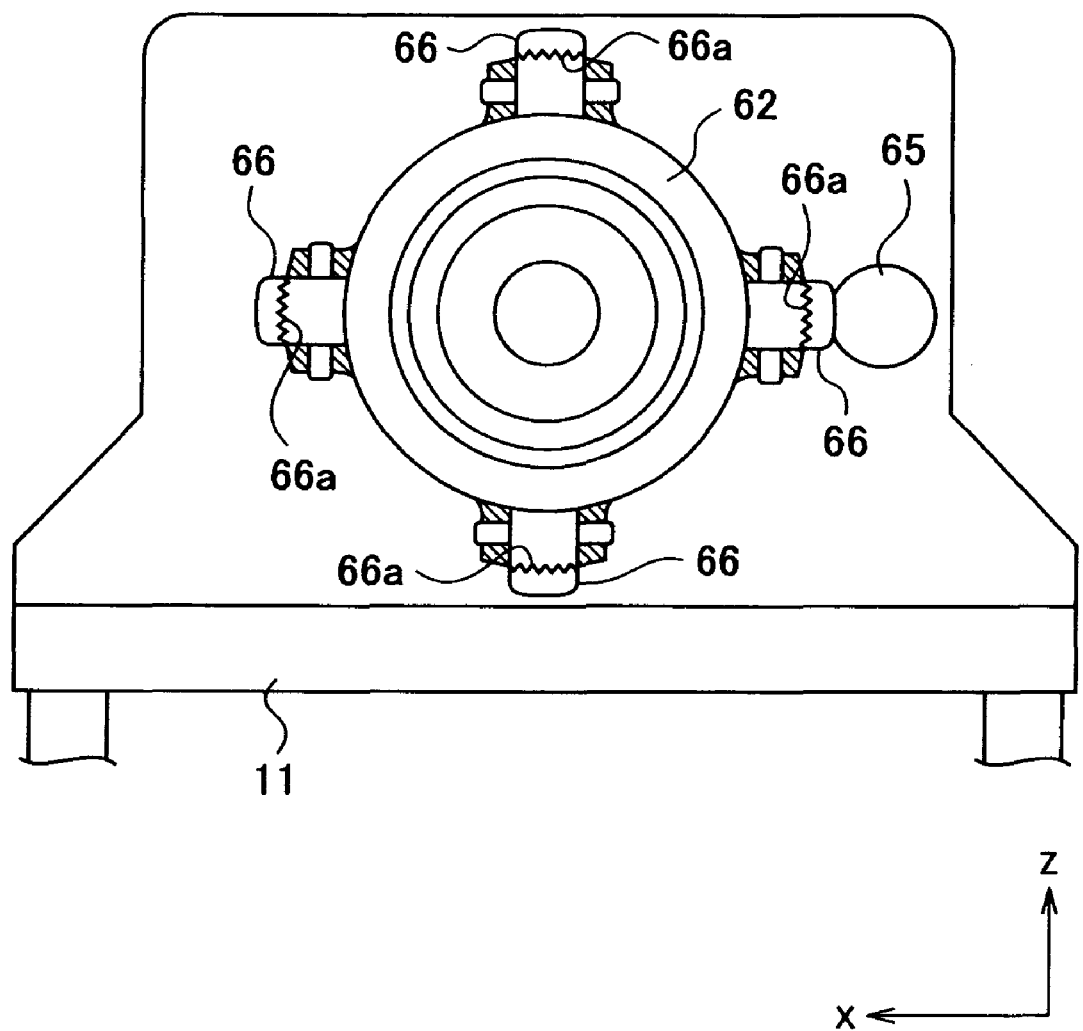
FIG. 8 is a front view of the coupling mechanism shown in FIG. 7.

As shown in FIG. 1, FIG. 4, and FIG. 6, the fixing mechanism 40 is disposed behind the carried-in engine E so as to fix the engine E at the test position immediately under the frame 20, and is formed by a holder 41 fixed to the base 10, two drive mechanisms 42 fixed to the holders 41, two clampers 43 connected to the respective drive mechanisms 42, etc. The drive mechanisms 42 are driven to move the clampers 43 in the straight line M direction (Y direction) and rotate them by a predetermined angle to face the ends 41a of the holder 41.

Then, the fixing mechanism 40 clamps a flange portion B of the engine E carried into the test position and firmly fixes it (the clampers 43 clamp the flange portion B having dowel holes for connecting a transmission in cooperation with the ends 41a) based on a control signal of the control unit 200.

Namely, by clamping the engine E carried into the test position by the clampers 43, the engine E can be firmly and smoothly fixed, so that the time for preparation for the motoring test can be shortened.

Figure 3:
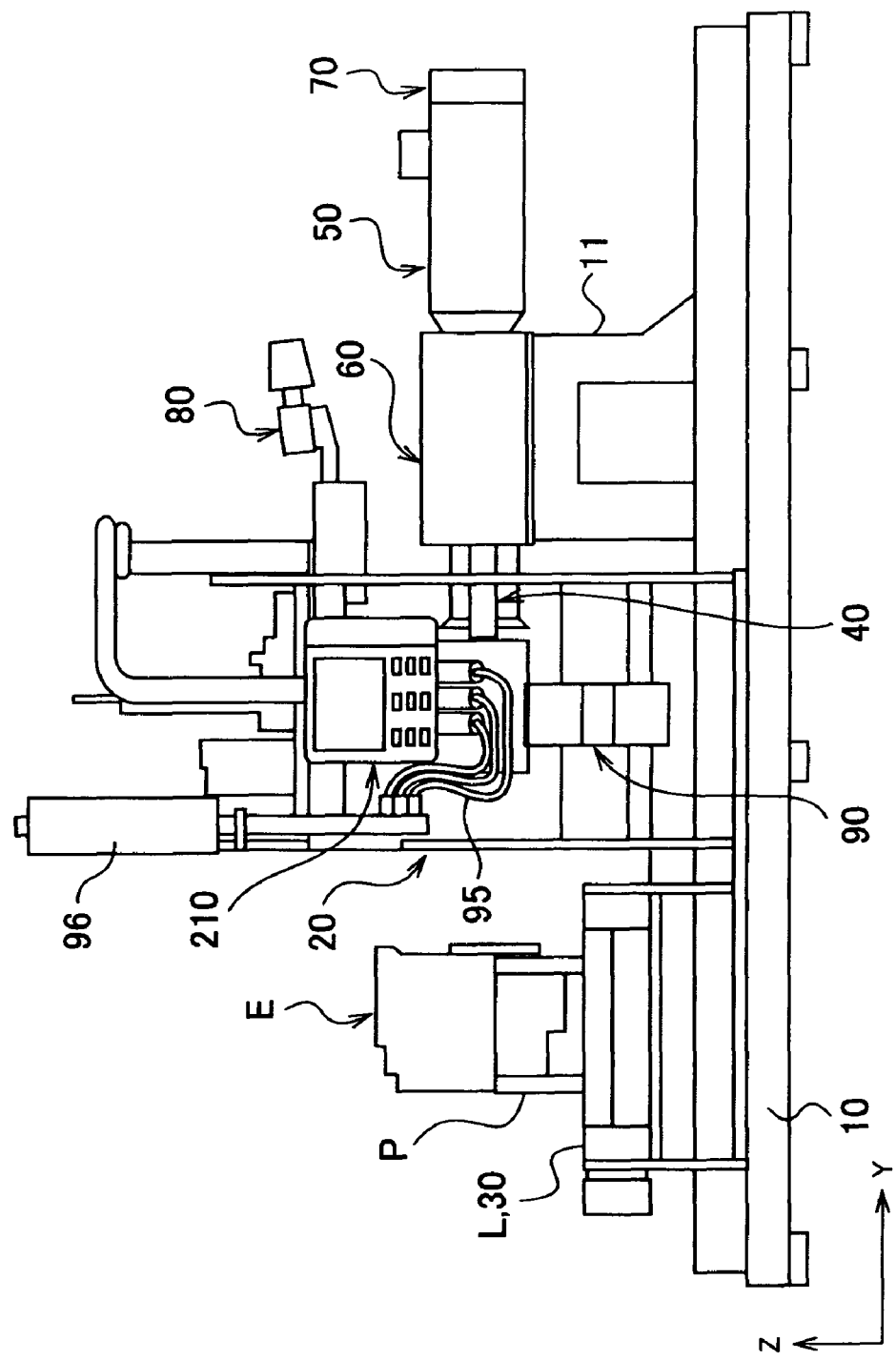
FIG. 3 is a side view showing a state in which the test equipment of motoring is installed in a part of the automatic engine assembly line.

The electrical motor 50 is fixed to the base 10 via the holder 11 as shown in FIG. 3, and is started and stopped based on a control signal of the control unit 200, and in a test mode, the electrical motor 50 rotates at a high speed of approximately 100 rpm through 3500 rpm to output a torque.

As shown in FIG. 1, FIG. 3, FIG. 4, FIG. 7, and FIG. 8, the coupling mechanism 60 is disposed behind the engine E fixed at the test position and is fixed to the base 10 via the holder 11, and is formed by a transmitting member 61 that directly transmits the rotation of the electrical motor 50 with a one-to-one relationship, an expanding portion 62 provided at the front end of the transmitting member 61, a movable member 63 having four (or three) rollers 63a externally slidably fitted on the expanding portion 62 and arranged at intervals of almost 90 degrees (or 120 degrees) in the circumferential direction, a lever 64 that moves the movable member 63 in the straight line M direction, a drive mechanism 65 that drives the lever 64, four coupling fingers 66 that have teeth 66a on the front ends and grooves 66b on the other ends and are swingably supported by the expanding portion 62, where the rollers 63a are engaged in the grooves 66b, a spring 67 that presses the movable member 63 forward (toward the engine E side), a torque meter 68 that detects a drive torque (or a load torque, torque fluctuations, etc.), etc. The transmitting member 61, the expanding portion 62, the movable member 63, and the coupling fingers 66 all become rotors that rotate together with the electrical motor 50, so that the rotation balance of these is maintained at a higher degree of accuracy than the crank shaft of the engine E.

When the drive mechanism 65 is not actuated, in this coupling mechanism 60, the movable member 63 is pressed forward by a pressing force of the spring 67, and the four coupling fingers 66 are held at rotated positions where their teeth 66a come closer to each other.

Before the engine E is carried in and reaches the test position, the coupling mechanism 60 expands the four coupling fingers 66 by moving the movable member 63 rearward by the drive mechanism 65 against the pressing force of the spring 67 based on a control signal of the control unit 200, and when the engine E reaches the test position and is fixed thereto, the coupling mechanism 60 leases the driving force of the drive mechanism 65 and engages the teeth 66a with a ring gear G (integrally provided on a flywheel) of the engine E.

Thereby, the electrical motor 50 and the crank shaft of the engine E are directly coupled to each other, so that the engine E can be securely rotated at the same number of rotations as that of the electrical motor 50, and the coupling operation can be easily conducted, so that the time for preparation for the motoring test can be shortened.

The encoder 70 is directly provided in the electrical motor 50 as shown in FIG. 3 and FIG. 4, and generates a high-frequency pulse signal as an operating standard of a motoring test in synchronism with (corresponding one-to-one to) the rotation of the electrical motor 50. In the encoder 70, an isolator is interposed for pulse input/output signals to minimize noise influence.

Based on a standard signal (clock signal) generated from the encoder 70, various operating state quantities are detected and the state of the engine E is evaluated.

Figure 9:
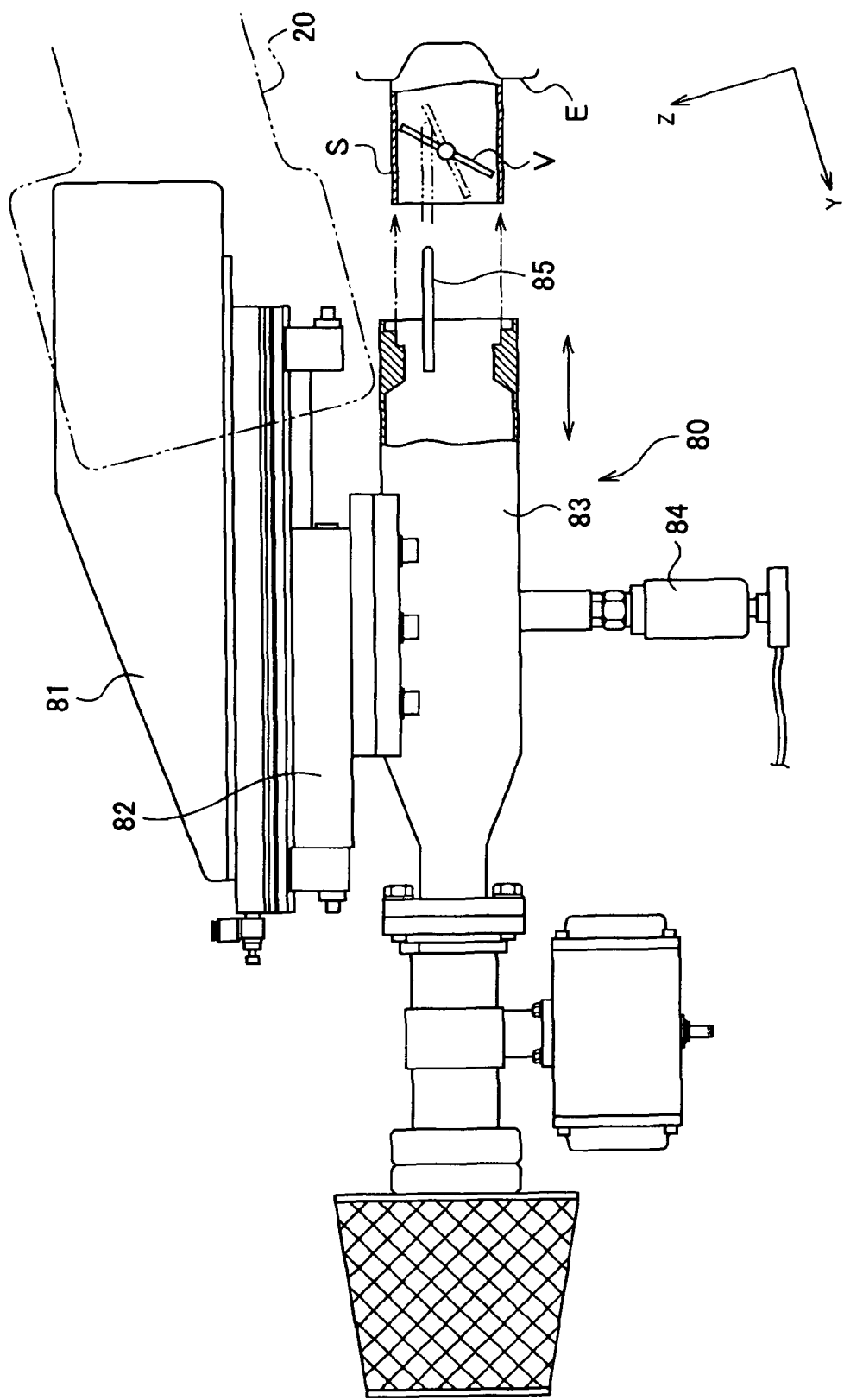
FIG. 9 is a side view showing an intake pressure detection unit of the engine.
Figure 10:
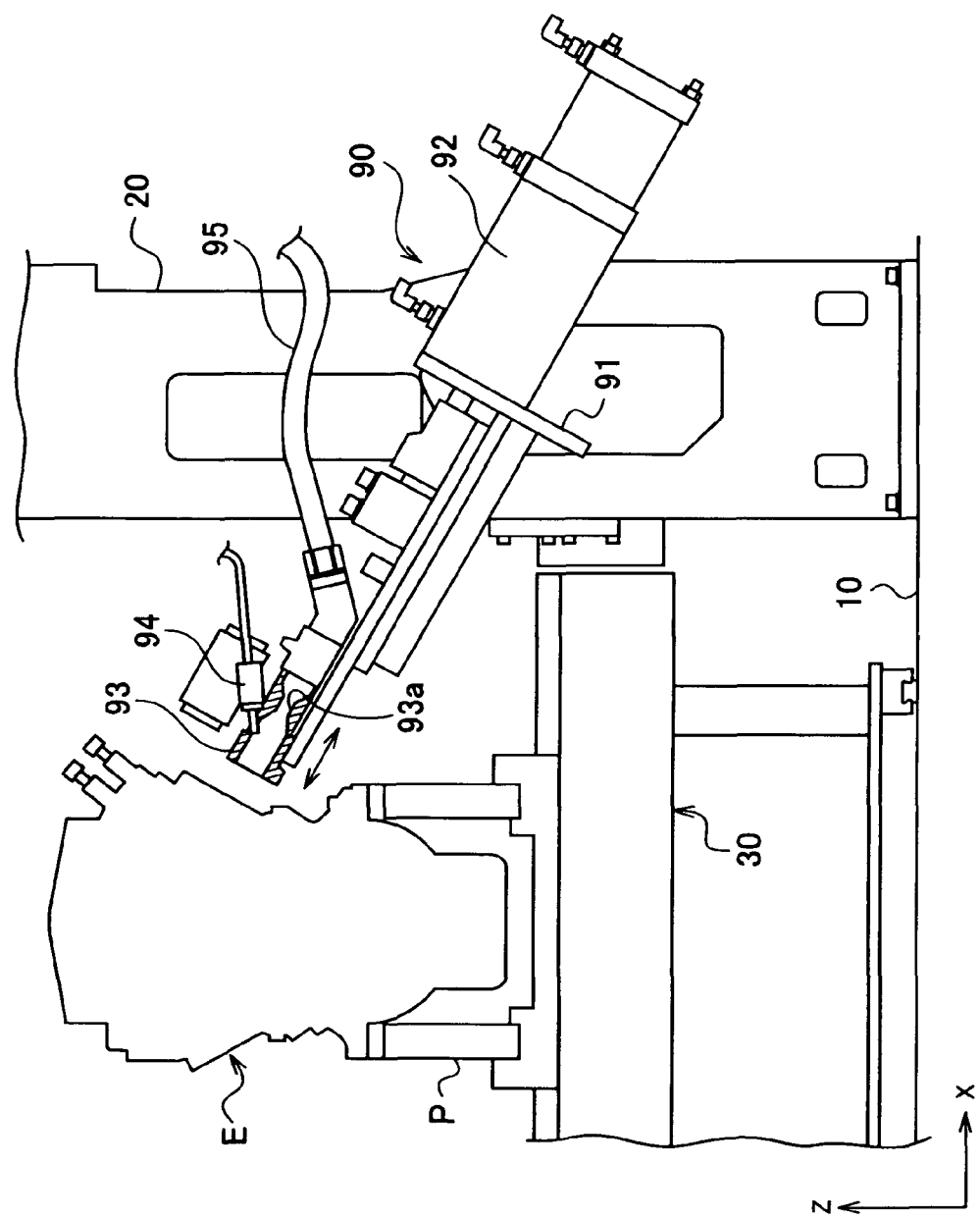
FIG. 10 is a front view showing an exhaust pressure detection unit of the engine.

The intake pressure detection unit 80 is formed by, as shown in FIG. 9, a bracket 81 fixed to the frame 20, a drive mechanism 82 held by the bracket 81, a connecting pipe 83 that is driven to reciprocate by the drive mechanism 82 and defines an intake passage, a detector 84 that is attached to the connecting pipe 83 and detects an internal intake pressure, a pressing rod 85 provided at the front end portion of the connecting pipe 83, an opening and closing valve that is controlled so as to open and close the passage inside the connecting pipe 83, etc.

The drive mechanism 82 drives reciprocatively the connecting pipe 83 so as to connect and disconnect the connecting pipe 83 to and from an intake pipe S (inspecting portion) of the engine E positioned at the test position. The detector 84 is a pressure sensor that can detect an intake pressure of the engine E. The pressing rod 85 presses the closed throttle valve V to open when the connecting pipe 83 of the intake pressure detection unit 80 is connected to the intake pipe S of the engine E positioned at the test position. Therefore, a motoring test can be smoothly conducted even for the engine E with the throttle valve V assembled.

As shown in FIG. 1, FIG. 2, FIG. 4, and FIG. 10, two exhaust pressure detection units 90 are provided on the left and right of the engine E, and each of the units 90 is formed by a bracket 91 fixed to the frame 20, a drive mechanism 92 held by the bracket 91, an exhaust pipe 93 that is driven to reciprocate by the drive mechanism 92 and guides air exhausted from the engine E, a throttle portion 93a provided inside the exhaust pipe 93, a detector 94 that is attached to the exhaust pipe 92 on further upstream than the throttle portion 93a and detects an internal exhaust pressure, an exhaust hose 95 connected to the exhaust pipe 94, a muffler 96 connected to the downstream end of the exhaust hose 95, an opening and closing valve that is controlled so as to open and close the passage inside the exhaust pipe 94, etc.

The drive mechanism 92 drives reciprocatively the exhaust pipe 93 so as to connect and disconnect the exhaust pipe 93 to and from an exhaust port (inspecting portion) of the engine E positioned at the test position. The detector 94 is a pressure sensor that can detect an exhaust pressure of the engine E. The exhaust hose 95 defines a large-area passage with few changes in capacity and forms a high-rigidity structure. Thereby, bound noise of continuous exhaust can be restrained. The muffler 96 is formed so that the exhaust flows spirally to increase the exhaust efficiency. Thereby, pressure loss and exhaust noise can be reduced.

Figure 11:
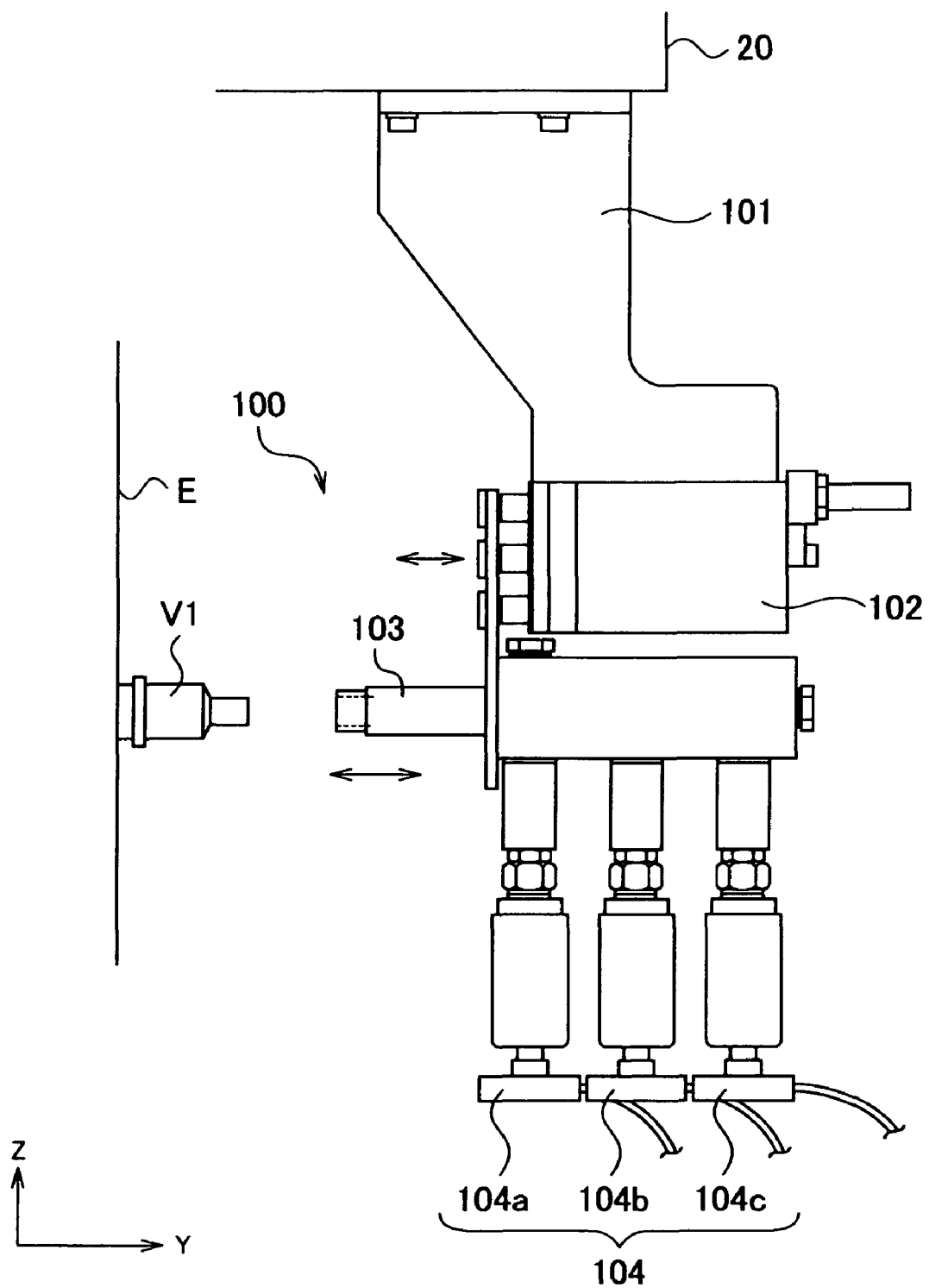
FIG. 11 is a side view showing a detection unit for detecting a pressure of a lubricating oil of the engine.

The oil pressure detection unit 100 is formed by, as shown in FIG. 11, a bracket 101 fixed to the frame 20, a drive mechanism 102 held by the bracket 101, a female connector 103 that is driven to reciprocate by the drive mechanism 102 and can be connected to a male connector V1 attached to an oil passage of the engine E, a detector 104 (104a, 104b, and 104c) that is attached to the female connector 103 and detects a pressure of a lubricating oil to be guided to the inside, etc.

The drive mechanism 102 drives reciprocatively the female connector 103 so as to connect and disconnect the female connector 103 to and from the male connector V1 (inspecting portion) of the engine E positioned at the test position. The detector 104 (104a, 104b, and 104c) is a pressure sensor that can detect the oil pressure (pressure of the lubricating oil). Herein, as the detector 104, a plurality of sensors are provided, and these can detect according to oil pressure levels in a multilevel manner, and can be dividedly used according to the type of the engine E.

The male connector V1 and the female connector 103 include check valves to close the respective passages when they are not connected to each other, and when they are connected to each other, the respective check valves open to communicate the passages with each other.

Therefore, it is not necessary to supply lubricating oil from outside for the test, and the pressure of a lubricating oil filled inside the engine E can be directly detected, so that the motoring test can be smoothly conducted.

Figure 12:
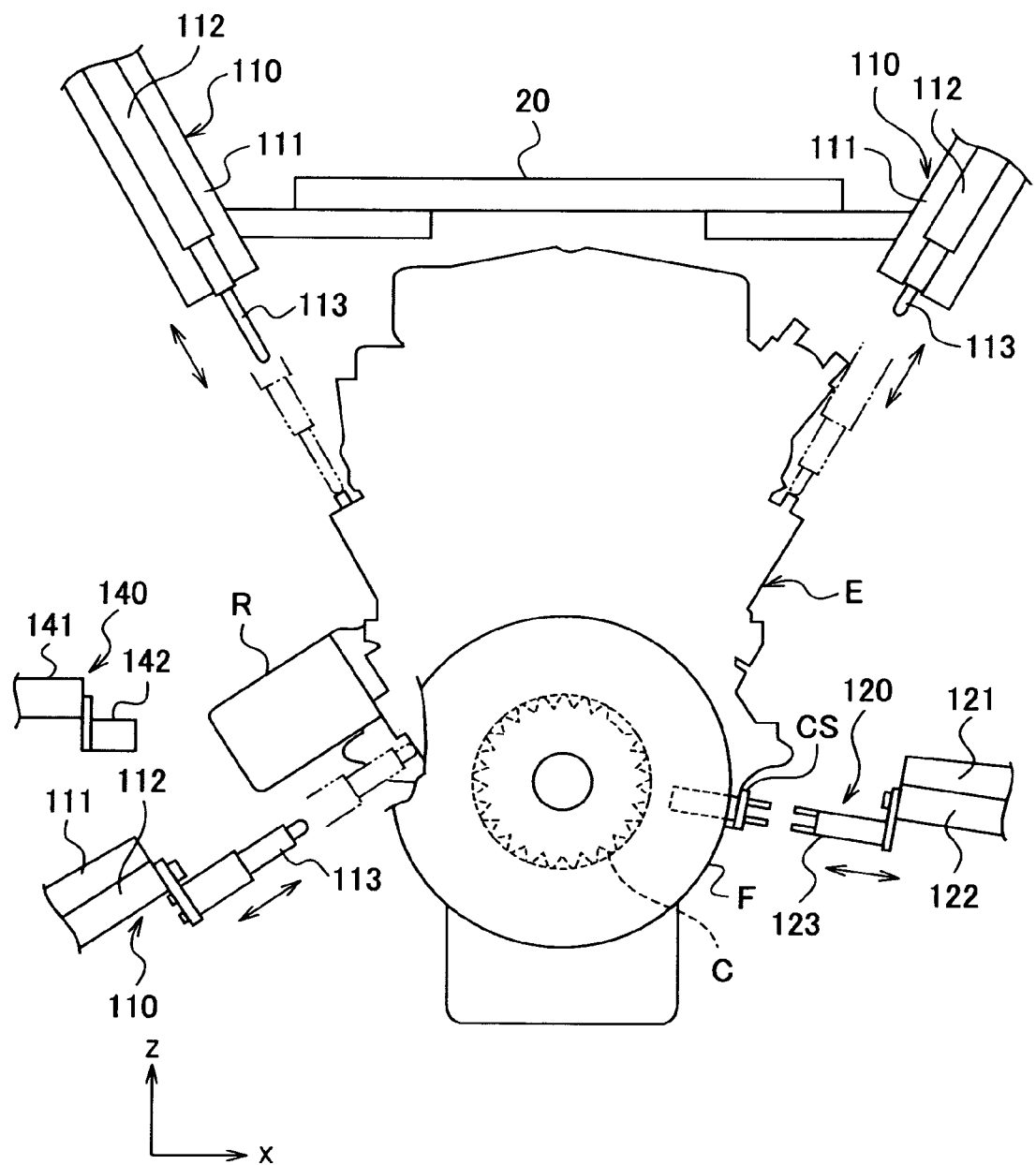
FIG. 12 is a front view showing detection units for respectively detecting the vibration level, the crank shaft rotation phase, and the oil filter temperature of the engine.

As shown in FIG. 12, for example, three vibration level detection units 110 are provided in the upper and lower regions of the engine E, etc., and each of the units 110 is formed by a bracket 111 fixed to the frame 20, a drive mechanism 112 held by the bracket 111, a detector 113 that is driven to reciprocate by the drive mechanism 112 and can be gotten butted against the outer wall of the engine E, etc.

The drive mechanism 112 drives reciprocatively the detector 113 so as to connect and disconnect the detector 113 to and from the outer wall (inspecting portion) of the engine E positioned at the test position. The detector 113 is an acceleration sensor that detects vibrations of the outer wall of the engine E.

Thus, detection of vibration levels can be conducted only by connecting and disconnecting the detector 113 to and from the engine E positioned at the test position, so that the motoring test can be smoothly conducted, and by measuring a plurality of points, the vibration level can be detected with a higher degree of accuracy.

The rotation phase detection unit 120 detects the rotation phase of the crank shaft of the engine E, and is formed by, as shown in FIG. 12, a crank angle sensor CS provided on the engine E, a bracket 121 fixed to the frame 20, a drive mechanism 122 held by the bracket 121, a probe 123 as a detector that is driven to reciprocate by the drive mechanism 122 and approach a timing plate C of the engine E, etc.

The drive mechanism 122 drives reciprocatively the probe 123 so as to make the probe 123 approach and separate from the timing plate C (inspecting portion) of the engine E positioned at the test position. Herein, the crank angle sensor CS is a rotation sensor for detecting an angle of rotation, for example, a proximity sensor that detects an index (a plurality of notches only one part of which is widened) provided on the timing plate C in a non-contact manner.

As the proximity sensor, for example, a high-frequency oscillating sensor that uses magnetic fields, a magnetic sensor, or an electrostatic capacitance sensor using electric fields can be applied.

Thus, detection of the rotation phase is conducted only by making the probe 123 approach and separate from the engine E positioned at the test position, so that the motoring test can be smoothly conducted while detecting the rotation phase with high accuracy.

As shown in FIG. 12, the oil filter temperature detection unit 140 is disposed in the vicinity of an oil filter R of the engine E, and is formed by a bracket 141 fixed to the frame 20, a detector 142 fixed to the bracket 141 so as to face the oil filter R of the engine E at a predetermined distance, etc. The detector 142 is, for example, an infrared sensor that can detect the temperature of the oil filter R in a non-contact manner. Thus, detection of the oil filter temperature can be indirectly conducted by the detector 142 fixed at a predetermined position on the frame 20 in a non-contact manner, so that this is preferable in the case where it is difficult to directly detect the temperature of the lubricating oil, and the structure and the control system can be simplified and the motoring test can be smoothly conducted.

Figure 13:
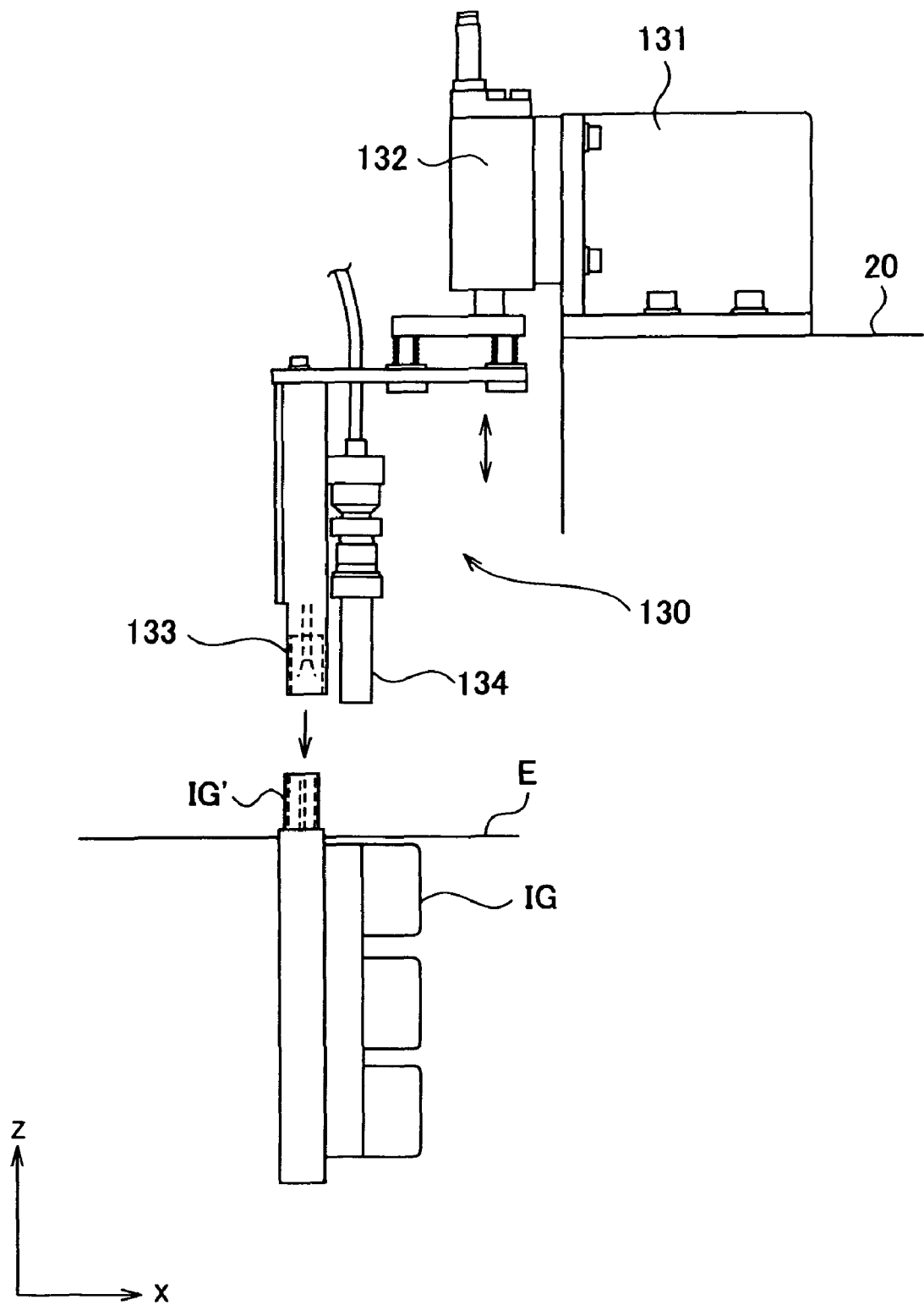
FIG. 13 is a side view showing an electrical characteristic detection unit for detecting electrical characteristics in an ignition system of the engine.

The electrical characteristic detection unit 130 is provided above the engine E as shown in FIG. 13, and is formed by a bracket 131 fixed to the frame 20, a drive mechanism 132 held by the bracket 131, a female connector 133 and a detector 134 that detects a voltage characteristic, that are driven to reciprocate by the drive mechanism 132, etc.

The drive mechanism 132 drives reciprocatively the female connector 133 and the detector 134 to connect and disconnect the female connector 133 to and from and to make the detector 134 approach and separate from an ignition system (ignition coil) IG (inspecting portion) of the engine E positioned at the test position.

The female connector 133 flows a predetermined current to the ignition system IG by being connected to a male connector IG' of the ignition system IG. The detector 134 detects the voltage characteristic generated in the ignition system IG according to current conduction.

Thus, the connector 133 is only connected to and disconnected from and the detector 134 is only approached and separated from the engine E positioned at the test position, so that the motoring test can be smoothly conducted while detecting the electrical characteristics of the ignition system IG with high accuracy.

The noise level detection unit 150 is disposed around the engine E positioned at the test position as shown in FIG. 15, and includes a noise sensor as a detector for detecting noise generated during motoring.

The atmosphere temperature detection unit 160 is disposed around the engine E positioned at the test position as shown in FIG. 15, and includes a temperature sensor as a detector for detecting the temperature of the atmosphere during motoring.

The atmosphere humidity detection unit 170 is disposed around the engine E positioned at the test position as shown in FIG. 15, and includes a humidity sensor as a detector for detecting the humidity of the atmosphere during motoring.

The outside air pressure detection unit 180 is disposed around the engine E positioned at the test position as shown in FIG. 15, and includes an air pressure sensor as a detector for detecting the outside air pressure during motoring.

The reading unit 190 is disposed below the pallet P holding the engine E positioned at the test position as shown in FIG. 15, and includes a sensor for reading ID data P1 provided on the pallet P before motoring.

Based on the ID data P1, a test mode, etc., for the carried-in engine E are set, and the crank stop angle, etc., for stopping after finishing the test are determined.

The control unit 200 is a sub-computer that functions as control means to generate a control signal by performing various signal processings, and functions as judging means for judging whether the state of the engine E is normal based on various signals.

Namely, the control unit 200 is connected to a host computer in the automatic engine production line via a high-speed bus communications (PROFIBUS communications) line 202 as shown in FIG. 14 and FIG. 15, and reads the ID data P1 of the engine E by the reading unit 190, obtains information on the test mode and the crank stop angle corresponding to the engine E from the host computer and sets these, transmits drive signals to the conveying mechanism 30, the fixing mechanism 40, the electrical motor 50, the coupling mechanism 60, and the detection units 80 through 130 via a drive circuit 201, and judges whether the tested engine E is normal by comparing the information (operating state quantities and atmosphere state quantities) obtained from the detection units 80 through 180 with the standard information obtained in advance from a normal engine E, and transfers the information to the host computer via the high-speed bus communications line 202.

Next, the motoring test in this equipment is explained with reference to FIG. 14 and FIG. 15. Herein, various driving controls are performed based on control signals of the control unit 200.

First, when an engine E that has been completely assembled is conveyed through the line L (conveyer) while being supported on the pallet P and reaches a motoring test process (inspection process), the conveying mechanism 30 carries the engine E together with the pallet P into the test position of the test equipment of motoring, the reading unit 190 reads the ID data P1, and the control unit 200 acquires a corresponding test mode and a crank stop angle from the host computer based on the ID data.

Subsequently, the fixing mechanism 40 fixes and positions the engine E carried into the test position, and the coupling mechanism 60 (coupling fingers 66) clamps the ring gear G of the engine E and directly couples the electrical motor 50.

Then, the detection units 80 through 130 (the intake pressure detection unit 80, the exhaust pressure detection unit 90, the oil pressure detection unit 100, the vibration level detection unit 110, the rotation phase detection unit 120, and the electrical characteristic detection unit 130) are set to be connected to or approach a corresponding inspecting portion of the engine E.

Subsequently, the electrical motor 50 starts at a predetermined number of rotations, and based on a pulse signal (clock signal) generated from the encoder 70 and information obtained from the rotation phase detection unit 120, crank angle positioning (zero point setting) for synchronizing the operation process of the engine E with the pulse signal is performed.

Then, a motoring test is conducted while the number of rotations of the electrical motor is properly changed (for example, N1 to N2 to N3 to N4) based on a test mode composed of phase A, phase B, phase C, and phase D, etc. During motoring, the noise level detection unit 150 detects the noise level around the engine E, the atmosphere temperature detection unit 160 detects the atmosphere temperature around the engine E, the atmosphere humidity detection unit 170 detects the atmosphere humidity around the engine E, and the outside air pressure detection unit 180 detects the outside air pressure around the engine E, respectively.

In the phase A, for example, data of the drive torque, the oil pressure, and the oil temperature are detected in a sampling manner by the torque meter 68, the oil pressure detection unit 100, and the oil filter temperature detection unit 140.

In the phase B, for example, data of the oil pressure, the oil temperature, and electrical characteristics (the presence or absence of disconnection and the proper or improper of ignition timing, etc.) of the ignition system (ignition coil, etc) are detected in a sampling manner by the oil pressure detection unit 100, the electrical characteristic detection unit 130, and the oil filter temperature detection unit 140.

In the phase C, for example, data of the intake pressure and the electrical characteristics of the ignition system are detected in a sampling manner by the intake pressure detection unit 80 and the electrical characteristic detection unit 130.

In the phase D, for example, data of the drive torque, the exhaust pressure, the oil pressure, and the oil temperature are detected in a sampling manner by the torque meter 68, the exhaust pressure detection unit 90, the oil pressure detection unit 100, and the oil filter temperature detection unit 140.

The control unit 200 judges whether the tested engine E is normal by comparing the information obtained through this test with the standard information of a normal engine E stored in advance, and transfers the results of judgment to the host computer. It is also possible that the control unit 200 transfers the information obtained through the test to the host computer and then the host computer makes a judgment by comparing the information with the standard information.

After the test is finished, the crank shaft of the engine E is stopped at a predetermined crank stop angle, the detection units 80 through 130 are disconnected or separated from the engine E, the clamping state of the coupling mechanism 60 is released, the fixing state of the fixing mechanism 40 is released, and the conveying mechanism 30 carries out the engine E to the original line L. Thereby, the series of inspection processes of the motoring test are finished.

According to the information obtained through the test described above, the state of the engine E can be totally evaluated. For example, from the information on the oil pressure and the oil temperature, the presence or absence of missing of parts or defects in the lubricating oil passage, the presence or absence of clogging of the lubricating oil passage due to swarf mixing, the presence or absence of erroneous assembling of parts, and the proper or improper of assembling clearances can be evaluated.

From the information on the drive torque, defects, missing parts, and erroneous assembling of bearings in the drive system including the crank shaft, the cam shaft, the piston ring, etc., mixing of swarf into sliding interfaces, and the proper or improper of fitting dimensions of parts can be evaluated.

From the information on the intake pressure and the exhaust pressure, the proper or improper of actuating timings of the intake valve and the exhaust valve, the presence or absence of erroneous assembling of parts, and the presence or absence of foreign materials adhering to the valve seating surfaces can be evaluated.

From the information on the electrical characteristics of the ignition system, the presence or absence of failures of the ignition coil (the proper or improper of discharging voltage and discharge time), the proper or improper of the ignition plug state, the presence or absence of disconnection of the electrical wiring, and the proper or improper of ignition timing can be evaluated.

From the information on the vibration level and the noise level, the proper or improper of operations in the drive system and the valve operating system, the proper or improper of assembling dimensions (clearances, etc.) of the parts in the drive system and the valve operating system can be evaluated.

By additionally taking the information on the atmosphere temperature, the atmosphere humidity, and the outside air pressure, etc., into account, the engine E can be evaluated with a higher degree of accuracy.

In the embodiment described above, as the engine E to be tested, a V-shaped 6-cylinder engine is shown, however, without limiting thereto, the motoring test equipment of the present invention can also be applied to other multi-cylinder V-shaped engines or straight multi-cylinder engines as well as single cylinder engines.

In the embodiment described above, as state quantities to be detected, the intake pressure, the exhaust pressure, the lubricating oil pressure, the lubricating oil temperature, the electrical characteristics of the ignition system, the vibration level, the rotation phase of the crank shaft, the noise level, the atmosphere temperature, the atmosphere humidity, and the outside air pressure are applied, however, without limiting thereto, other state quantities can also be detected as long as they contribute to evaluation of the engine E.

As described above, according to the test equipment of engine motoring of the present invention, a motoring test can be automatically conducted for engines, and an inspection of defects can be conducted with high accuracy. Therefore, this equipment can be applied to an automatic production line for automatically assembling engines, etc., whereby the productivity of the engines can be improved.

As described above, the test equipment of engine motoring of the present invention can automatically conduct a motoring test for engines, so that it is useful for conducting the motoring test for all engines and conducting the motoring test for different types of engines particularly in an automatic engine assembly line, etc.

What is claimed is:

1. Test equipment of engine motoring comprising:
a conveying mechanism that carries in and carries out an engine to and from a test position;
a fixing mechanism that fixes the engine carried into the test position;
a coupling mechanism configured so as to directly couple an electrical motor to a crank shaft of the engine and to detect a drive torque;
an encoder that generates a pulse signal as an operating standard in synchronism with rotation of the electrical motor;
a plurality of detection units that are driven to reciprocate so as to be connected to and disconnected from or approach and separate from the engine positioned at the test position and detect a plurality of operating state quantities;
a control means for controlling operations of the electrical motor, the conveying mechanism, the fixing mechanism, the coupling mechanism, and the plurality of detection units;
a judging means for judging whether the engine is normal by comparing information obtained by the plurality of detection units with standard information obtained in advance; and
a base that holds the electrical motor and the coupling mechanism and supports the conveying mechanism;
wherein the base is provided with a frame formed into a gate shape that opens in the conveying direction of the conveying mechanism and covers both sides and a top of the engine at the test position; and
wherein the plurality of detection units are supported on the frame.

2. The test equipment of engine motoring as set forth in claim 1, wherein
for an engine to be carried-in by the conveying mechanism, ID data for identifying the engine is set, and
the control means sets a test mode of the engine based on the ID data.

3. The test equipment of engine motoring as set forth in claim 1, wherein
the fixing mechanism includes a clamper that clamps a flange portion formed on a cylinder block of the engine.

4. The test equipment of engine motoring as set forth in claim 1, wherein
the coupling mechanism includes a plurality of coupling fingers that are swingably driven so as to engage with a ring gear directly fixed to the crank shaft of the engine and rotate together with the electrical motor.

5. The test equipment of engine motoring as set forth in claim 1, further comprising:
a detection unit that detects at least one state quantity among an oil filter temperature of an engine, and a noise level, an atmosphere temperature, an atmosphere humidity, and an outside air pressure around the engine during motoring.

6. The test equipment of engine motoring as set forth in claim 5, wherein
the detection unit includes an oil filter temperature detection unit that detects an oil filter temperature of the engine, and
the oil filter temperature detection unit includes a non-contact type detector that detects an oil filter temperature from an outside thereof.

7. The test equipment of engine motoring as set forth in claim 1, wherein
the plurality of detection units detect at least two operating state quantities among an intake pressure, an exhaust pressure, a pressure of a lubricating oil, a temperature of the lubricating oil, a vibration level, a rotation phase of a crank shaft, and electrical characteristics of an ignition system in an engine during motoring.

8. The test equipment of engine motoring as set forth in claim 7, wherein
each of the plurality of detection units includes a detector that detects an operating state quantity of an engine positioned at the test position, and a drive mechanism that drives reciprocatively the detector so as to connect to and disconnect from or make the detector approach and separate from an inspecting portion of the engine.

9. The test equipment of engine motoring as set forth in claim 7, wherein
the plurality of detection units include an intake pressure detection unit that detects an intake pressure, and
the intake pressure detection unit includes a connecting pipe configured so as to be connected to and disconnected from an intake pipe of the engine, and a pressing rod configured so as to open a throttle valve disposed inside the intake pipe when the connecting pipe is connected to the intake pipe of the engine.

10. The test equipment of engine motoring as set forth in claim 7, wherein
the plurality of detection units include an exhaust pressure detection unit that detects an exhaust pressure, and
the exhaust pressure detection unit includes an exhaust pipe that guides air exhausted from the engine, a throttle portion provided inside the exhaust pipe, and a detector that is disposed further upstream than the throttle portion and detects an exhaust pressure.

11. The test equipment of engine motoring as set forth in claim 7, wherein
the plurality of detection units includes an electrical characteristic detection unit that detects electrical characteristics of an ignition system, and
the electrical characteristic detection unit includes a connector that is connected to the ignition system of the engine and conducts a current, and a detector that detects a voltage characteristic generated in the ignition system according to current conduction.

* * * * *